Patented Oct. 31, 1933

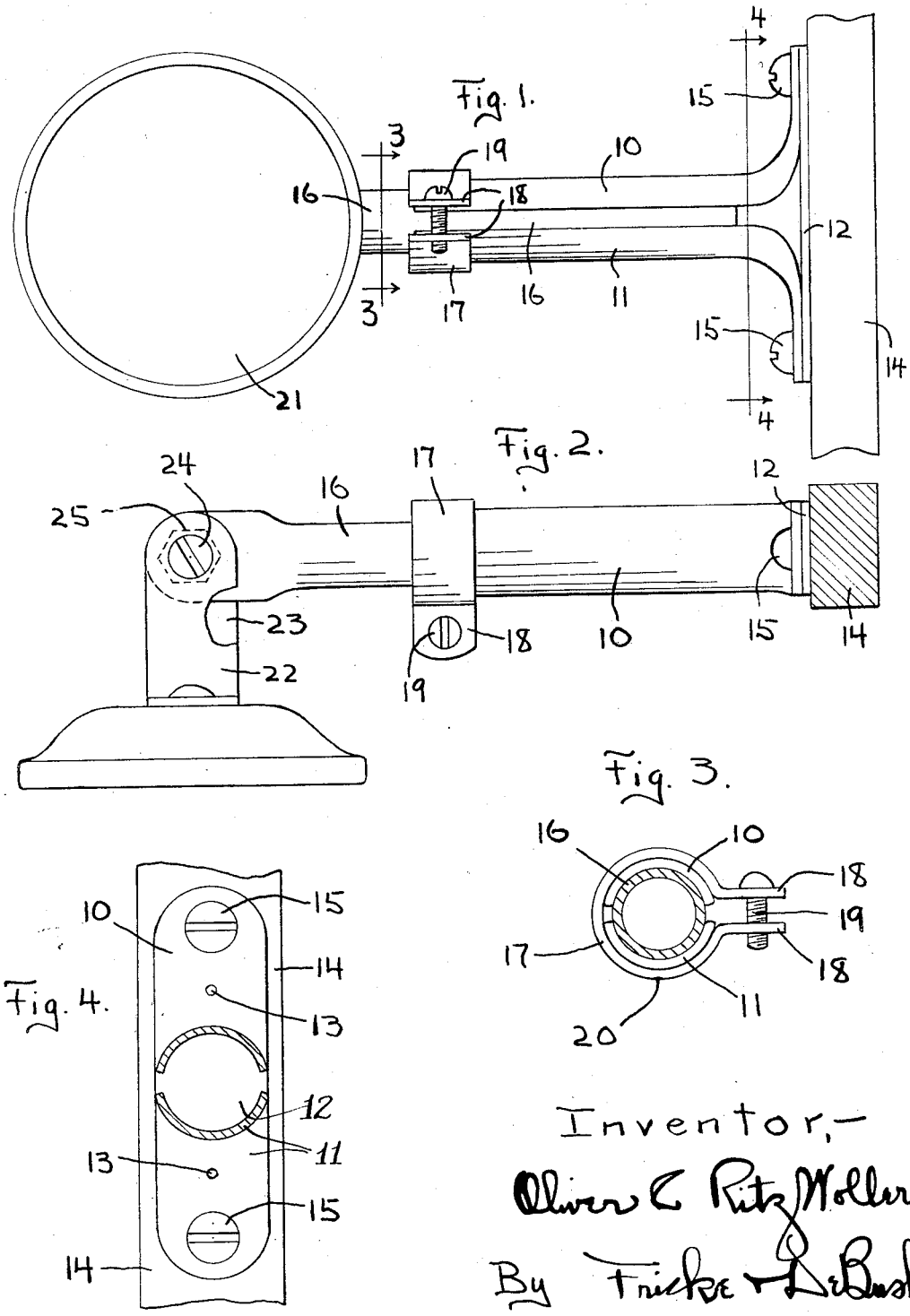

1,932,483

UNITED STATES PATENT OFFICE 1,932,483

SUPPORT FOR MIRRORS

Oliver C. Ritz Woller, Chicago, Ill.

Application April 28, 1931. Serial No. 533,487

2 Claims. (Cl. 248—1)

My invention relates to supports for mirrors and particularly to supporting means for rear-view mirrors for trucks. As is fully appreciated, under ordinary conditions it is necessary that a rear-view mirror for a truck be supported at one side of the truck body where it is adjusted both laterally and vertically to the desired angular position for enabling the driver in his substantially fixed position to see backwardly along the side of the truck body, it being in most cases impractical to arrange for a view directly back from the position of the driver. It is the object of my invention to provide a new and improved form and arrangement of parts which shall be effective for holding a mirror firmly in the desired adjusted angular position, which shall be of such a nature that it can be produced and assembled quickly and cheaply, and which shall nevertheless be of light weight, sturdy construction, and attractive appearance.

It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,

Fig. 1 is a side view of the preferred form of my device supporting a mirror in position;

Fig. 2 is a top plan view of the parts shown in Fig. 1; and

Figs. 3 and 4 are vertical cross sections taken at line 3—3 and line 4—4 respectively of Fig. 1.

Referring now to the several figures of the drawing, in which corresponding parts are indicated by the same reference characters, 10 and 11 indicate angles formed of strip metal, the angles being oppositely disposed in spaced relation to each other with their shorter arms mounted upon a base 12 as is best shown in Fig. 1, said arms being preferably connected with the base 12 by spot-welding as at the points 13 as indicated in Fig. 4. In the construction shown, the bracket comprising the angles and the base is mounted in position upon an upright support 14 by means of screws 15 as is clearly shown in said Figs. 1 and 4.

As is best shown in Fig. 4, the longer arms of the angles 10 and 11 are pressed into curved form so as to provide an open socket between them adapted to receive a bar 16 forming the support of the mirror as hereinafter described. About the free ends of the longer arms of the angles 10 and 11 I have provided a split sleeve 17 which in the construction shown is bent out of a strip of sheet metal, having oppositely disposed outwardly extending lugs 18 adjustably connected by means of a set screw 19 which passes loosely through one of the lugs and has screw threaded connection with the other lug. In the arrangement shown, the sleeve 17 is connected with the longer arm of the angle 11 at substantially the lowermost portion of the ring, by spot welding as at 20 as shown in Fig. 3. As will be readily appreciated, the ring 17 is adapted to be contracted through the medium of the set screw 19, serving to draw the oppositely disposed longer arms of the angles 10 and 11 toward each other for gripping the bar 16 firmly therebetween, such gripping engagement being effected against the resiliency of the angles 10 and 11. It will be appreciated that such gripping effect can be produced in any adjusted position of the bar 16 in the socket either longitudinally of the socket or angularly therein.

In the arrangement shown, the bar 16 is in the form of a tube flattened at its outer end as is best shown in Fig. 2, having a mirror 21 of any suitable type connected to its outer end by means of angles 22 and 23 mounted upon the mirror in slightly spaced relation so as to receive the flattened end of the bar 16 therebetween. The mirror 21 is held in adjusted angular position upon the arm 16 by means of a set screw 24 passing through suitable openings in the bar 16 and the brackets 22 and 23. The set screw or bolt 24 is preferably provided with a nut 25 as indicated in dotted lines in Fig. 2 for tightening the brackets 22 and 23 into frictional engagement with the end of the bar 16.

By the use of my construction, I have provided an arrangement which can be produced very readily and can be very quickly and easily assembled as a unitary structure, one which is of comparatively great strength so as to be unlikely to become out of order, and one which can be very quickly and readily adjusted to the desired extent, being adjustable angularly both vertically and horizontally and being adjustable bodily toward the left in Fig. 1 to the desired position. This adjustability in three directions is secured by the use of a very small number of parts and with a minimum of material. The parts are preferably formed of aluminum so as to keep the weight down as low as possible. The arrangement is such that the device is not likely to be loosened by vibration, and is such that there is no likelihood of rattling of the parts under any ordinary conditions of use.

While I prefer to employ the construction as illustrated in my drawing and as above described, and comprising specifically the connection of the split ring to the angles, and the connection of the angles to the base 12, by spot-welding, it is to be understood that my invention is not limited to the details as specified except so far as the claims may be so limited by the prior art.

I claim:—

1. A bracket for truck mirrors, comprising in combination two angles, a base in the form of a bar to which one of the arms of each of said angles is secured by spot-welding, with the other arms of the angles oppositely disposed in spaced relation to each other and curved for providing a socket between them, a split ring surrounding said oppositely disposed arms and connected at one point thereabout by spot-welding with one of said arms, and means for contracting said split ring for drawing said arms closer together against the resiliency of the arms.

2. A bracket for truck mirrors, comprising in combination two angles, a base in the form of a metal bar to which corresponding arms of said angles are secured so as to hold the other arms of the angles in oppositely disposed position and in spaced relation to each other, said other arms being curved for providing a socket between them, a split ring surrounding said other arms and having a fixed connection with one of said other arms so as to hold the ring permanently in operative position with respect thereto, and means for contracting said split ring for drawing said arms closer together.

OLIVER C. RITZ WOLLER.